United States Patent
Kemmochi et al.

(10) Patent No.: US 7,854,157 B2
(45) Date of Patent: Dec. 21, 2010

(54) METHOD OF ELONGATING OPTICAL FIBER BASE MATERIAL, AND APPARATUS FOR ELONGATING THE SAME

(75) Inventors: Soichiro Kemmochi, Tokyo (JP); Waichi Yamamura, Ibaraki (JP); Takaaki Nacao, Ibaraki (JP); Mitsukuni Sakashita, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 726 days.

(21) Appl. No.: 10/585,986

(22) PCT Filed: Jan. 12, 2005

(86) PCT No.: PCT/JP2005/000257

§ 371 (c)(1),
(2), (4) Date: Jul. 13, 2006

(87) PCT Pub. No.: WO2005/068384

PCT Pub. Date: Jul. 28, 2005

(65) Prior Publication Data

US 2007/0163302 A1    Jul. 19, 2007

(30) Foreign Application Priority Data

Jan. 14, 2004  (JP) .............................. 2004-006878
Jan. 7, 2005   (JP) .............................. 2005-002763

(51) Int. Cl.
*B21C 9/00* (2006.01)

(52) U.S. Cl. .......................... 72/286; 72/31.13; 72/251; 72/291; 72/342.1

(58) Field of Classification Search .................. 33/273; 72/286, 20.5, 10.1, 13.4, 20.3, 31.07, 37, 72/31.13, 128, 205, 248, 251, 274, 289, 291, 72/342.1, 342.5, 342.6, 342.94, 342.96, 364, 72/377; 65/377
See application file for complete search history.

(56) References Cited

U.S. PATENT DOCUMENTS

| | | | | |
|---|---|---|---|---|
| 3,250,362 | A | * | 5/1966 | Mitchell .................... 193/35 R |
| 4,345,451 | A | * | 8/1982 | Pamplin et al. ................ 72/286 |
| 4,386,513 | A | * | 6/1983 | Doudet ........................ 72/256 |
| 4,594,872 | A | * | 6/1986 | Nordlof ....................... 72/164 |

(Continued)

FOREIGN PATENT DOCUMENTS

JP         57-121810 A   *   7/1982

(Continued)

*Primary Examiner*—Edward Tolan
(74) *Attorney, Agent, or Firm*—McGinn Intellectual Property Law Group, PLLC

(57) ABSTRACT

The method, in which base material ingot 1 is heated and softened in an electric furnace 3, drawn with a pair of pinch roller 6 and 6, and elongated to make base material rod 7 having a smaller diameter than the ingot, features: forming either a roller groove 11 having a curvature radius which is larger than the outer diameter of the base material rod 7 or a V-shaped roller groove 11 having the cross section consisting of straight lines on the surface of the pinch roller 6 made of metal; nipping with the facing roller grooves 11 and 11 respectively formed on the surfaces of a pair of said pinch rollers 6 and 6; and drawing said base material rod.

15 Claims, 4 Drawing Sheets

U.S. PATENT DOCUMENTS

| | | | | |
|---|---|---|---|---|
| 4,650,380 | A * | 3/1987 | Lipowski | 409/310 |
| 5,248,656 | A * | 9/1993 | Nagesh et al. | 505/434 |
| 6,694,584 | B1 * | 2/2004 | Ahrens | 29/81.01 |
| 6,742,363 | B1 * | 6/2004 | Yamamura et al. | 65/377 |

FOREIGN PATENT DOCUMENTS

| | | | |
|---|---|---|---|
| JP | 61-88916 | * | 5/1986 |
| JP | 62-167236 | | 7/1987 |
| JP | 9-202636 | | 8/1997 |
| JP | 10-81531 | | 3/1998 |
| JP | 10-310443 | | 11/1998 |
| JP | 2000-264664 | | 9/2000 |
| JP | 2001-122635 | | 5/2001 |
| JP | 2003-238185 | | 8/2003 |

* cited by examiner

METHOD OF ELONGATING OPTICAL FIBER BASE MATERIAL, AND APPARATUS FOR ELONGATING THE SAME

TECHNICAL FIELD

The present invention relates to a method of elongating optical fiber base material, and an apparatus for elongating the same, especially, to the method of elongating base material ingot to make base material rod having a smaller diameter so that the optical fiber base material rod can be less curved after elongated and the apparatus for elongating the same.

The contents of Japanese Patent Applications Nos. 2004-6878 and 2005-2763 are incorporated in the present application by reference if applicable in the designated state.

BACKGROUND ART

To elongate base material ingot for optical fibers to make a base material rod for optical fibers having a smaller diameter, the method in which while the base material ingot is set and heated to be softened in an air-through vertical electric furnace, the ingot is fed from the entrance of the electric furnace at a certain speed, grasped the fore-end thereof and drawn at a higher speed than the feed speed so that the base material rod having a smaller diameter than the base material ingot can be drawn has been disclosed in Patent Document 1.

Patent Document 1: Japanese Patent Application Publication No. 62-167236.

DISCLOSURE OF THE INVENTION

Problems to be Solved by the Invention

During the elongation, the base material rod having a smaller diameter is nipped by a pair of pinch rollers and drawn. Pinch rollers are often made of nonmetal such as compressed ceramic fiber. The surfaces of the used pinch rollers were burnt and damaged by contacting with the base material rod having a high temperature of over 400 degree centigrade, which causes the rollers to change size and shape with time. The pinch rollers, therefore, cannot draw the rod at the proper position, which makes the base material rod curved.

The pinch rollers are tightened with a tapered shaft fitting to be fixed on a drive shaft, which makes it difficult to decide the axial position of the pinch roller. Every time the pinch roller is changed, the drawing position will be deviated, which causes the base material rod curved.

It is difficult to cut grooves in the pinch rollers made of nonmetal such as compressed ceramic fibers. Even if the pinch rollers have fine grooves, because of the above reason, the positions of grooves cannot be fixed. Alternatively, the groove automatically generated on the surface of the pinch roller by burnout of a high-temperature base material rod is used. Until the definite groove is formed, the base material rod does not have a fixed position in between the pinch rollers, which causes that the drawing position is deviated to make the base material rod curved.

If the base material rod curves substantially, the rod is additionally corrected the curvature thereof with a glass lathe. This increases the cost of manufacturing the base material rod. The automatically formed grooves may be formed in wrong positions and largely deviated. To reduce the curvature of the base material rod, positioning of the pinch roller should be controlled based on the groove center, which disturbs increasing the productivity in elongating process.

The present invention has the purpose of providing the method of elongating optical fiber base material without being curved and correcting the curvature, and with high productivity, and the apparatus for elongating the same.

MEANS FOR SOLVING THE PROBLEMS

The method of elongating optical fiber base material, related to the present invention, in which base material ingot is heated and softened in such as an electric furnace, drawn with a pair of pinch rollers, and elongated to make base material rod having a smaller diameter than the ingot, features: forming either a roller groove having a curvature radius which is larger than the outer diameter of the base material rod or a V-shaped roller groove having the cross section consisting of straight lines on the surface of the pinch roller made of metal; nipping with the facing roller grooves respectively formed on the surfaces of a pair of the pinch rollers; and drawing the base material rod.

The other present invention is the method of elongating optical fiber base material, in which base material ingot is heated and softened in such as an electric furnace, drawn with a pair of pinch rollers, and elongated to make base material rod having a smaller diameter than the ingot, features: using an untapered shaft having a reference edge face which is parallel to the elongating direction, pushing the pinch rollers against the reference edge face to be fitted and fixed to the untapered shaft; and adjusting the position of the groove center of facing roller grooves respectively formed on the surfaces of the pair of pinch rollers with using a positioning adjustment apparatus which supports the pinch rollers.

In the method of elongating optical fiber base material, related to the present invention, a shorter rod having almost the same outer diameter as the desired base material rod is nipped and held by the pair of pinch rollers, and a positioning adjustment apparatus supporting the pinch rollers is adjusted the position of the apparatus using a vertical line of laser beam or a plumb bob, which is parallel to the traveling direction of the base material ingot, runs through the middle of the heater such as an electric furnace and the center point of the shorter rod, to determine the positions of the pinch rollers. Instead of the above shorter rod, a jig comprising an upper board and a cylindrical part may be mounted on the pair of pinch rollers, and the cylindrical part is held on the pinch rollers to determine the positions of the pinch rollers.

The apparatus used for elongating optical fiber base material, related to the present invention, in which base material ingot is heated and softened in such as an electric furnace, drawn with a pair of pinch roller, and elongated to make base material rod having a smaller diameter than the ingot, features having the pinch rollers made of metal, and respectively having either a roller groove having a curvature radius which is larger than the outer diameter of the base material rod or a V-shaped roller groove having the cross section consisting of straight lines on the surfaces of the pinch rollers.

The apparatus for elongating optical fiber base material of the present invention may comprise: an untapered shaft, which holds pinch rollers in the way the pinch rollers are rotatable, and has a reference edge face being parallel to the elongating direction and used for positioning the pinch rollers; and a position adjustment apparatus adjusting the position of the untapered shaft. The surfaces of the pinch rollers are winded and fixed a woven fabric made of heat-resistant material to prevent the metal pinch rollers and the base material rod from directly contacting to each other.

The above description of the present invention does not cite all the features of the present invention. The sub-combinations of these features may also be inventions.

EFFECT OF THE INVENTION

According to the elongating method and apparatus of the present invention, the following advantageous effects can be obtained.

(i) The less curved base material rod can be constantly produced with high percentage. Correcting process, in which the curved rod is corrected using with a glass lathe, can be omitted so that the manufacturing cost of the base material rod can be reduced.

(ii) The pinch rollers drawing the base material rod are made of metal and the surfaces thereof are winded heat-resistant fabric, instead of being made of compressed ceramic fiber so that the pinch rollers can prevent from burnout and deformation due to the high-temperature base material rod. The pinch rollers, which had to be changed to new ones in relatively short period, do not have to be changed, and only the heat-resistant fabric winded around the surfaces of the pinch rollers is changed as a consumable so that the productivity in the elongating process can be improved and the power consumption can be reduced.

(iii) The pinch roller drawing the base material rod is made of metal and winded heat-resistant fabric around the surfaces thereof, instead of being made of conventional compressed ceramic fiber, and for a mounting shaft of the pinch rollers, an untapered shaft having a reference edge face is used. The reference edge face is used for determining where to mount the pinch rollers so that the primary positions of the roller grooves of the pinch rollers can be determined. This can eliminate the position adjustment, which was essential when the pinch rollers were changed, so that the productivity in the elongating process can be improved, and the power consumption can be reduced.

(iv) The heat-resistant fabric is winded around the surfaces of the pinch rollers drawing the high-temperature base material rod, and covers the roller grooves so that the pinch rollers don't directly touch the base material rod, which can prevent the surface of the base material rod from being damaged. The heat-resistant fabric is thin enough not to reduce the form accuracy of the grooves respectively formed on the surfaces of the pinch rollers. Being consumable, the fabric has a long lifetime enough for practical use due to the cooling effect of the metal pinch rollers.

BRIEF DESCRIPTION OF THE DRAWINGS

FIG. 1 is a longitudinal sectional view schematically showing the apparatus of the present invention used for elongating base material ingot.

BEST MODE FOR CARRYING OUT THE INVENTION

The following description explains the present invention with embodiments. The embodiments described below do not limit the invention claimed herein. All of the combinations described on the embodiments are not essential to the solutions of the present invention.

In the method of drawing thinned base material rod from an outlet of such as an electric furnace using pinch rollers, related to the present invention, a pair of the pinch rollers whose surfaces have roller concave grooves for stably nipping the base material rod is accurately mounted on a position adjustment table via a mechanical reference level included in an untapered shaft, and woven fabric made of heat-resistant material is winded and fixed around the surfaces of the pinch rollers not to directly contact the metal base material rod with the pinch rollers. An electric furnace whose heat source is a heater or a heating furnace whose heat source is a burner flame may be used.

The pinch rollers having such structure is adjusted the position thereof so that the straight line connecting the central axis of the heater such as an electric furnace with the groove center of the roller grooves respectively formed on the surfaces of the pair of pinch rollers is parallel to the traveling direction of the base material ingot fed into the heater such as an electric furnace. This can prevent the heated and softened part, in which the base material ingot shrinks the diameter to transform into the base material rod, from getting bending moment from the pinch rollers, which can make the elongated base material rod less curved.

Figure 2A:
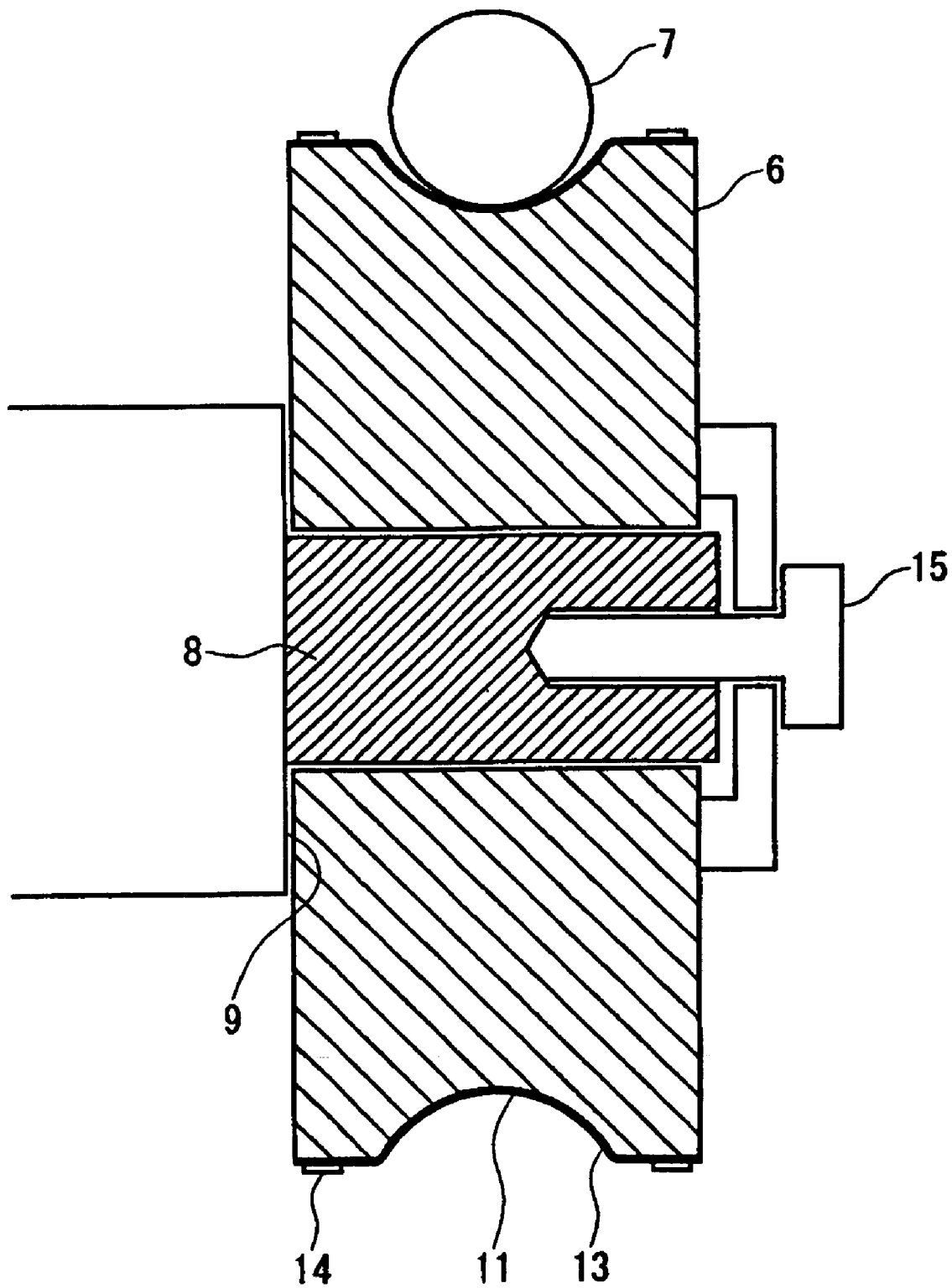
FIGS. 2A and 2B are enlarged schematic sectional view of the pinch roller cut along the line A-A indicated in FIG. 1.
Figure 2B:
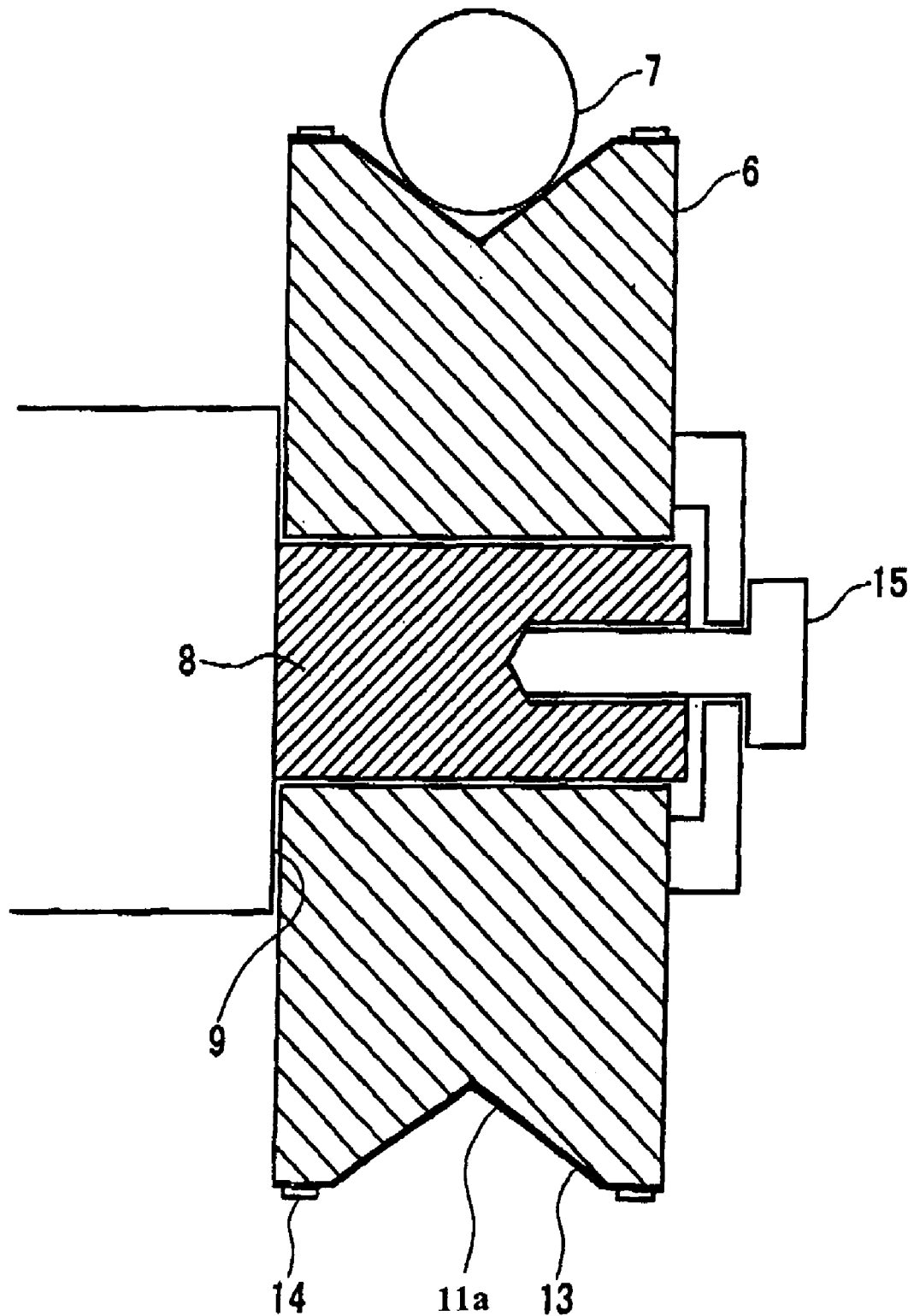
Figure 3:
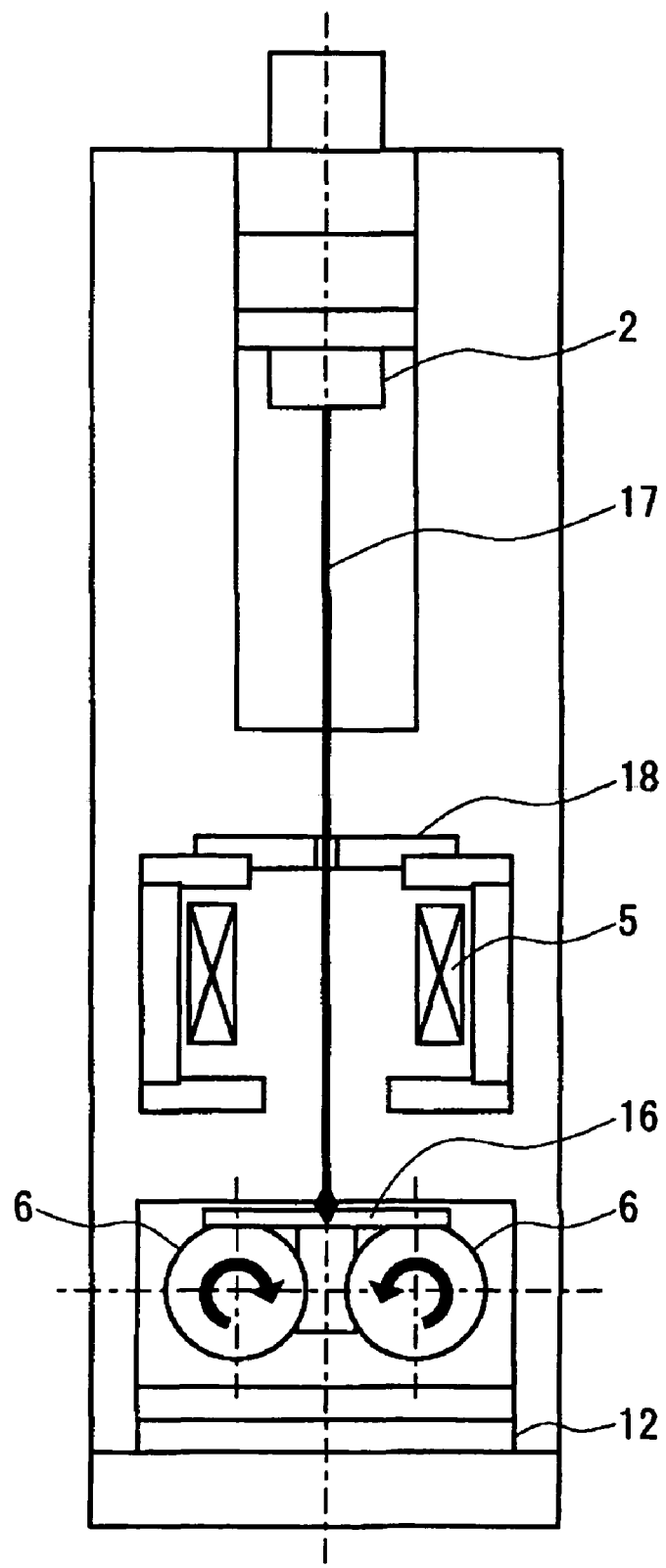
FIG. 3 is a schematic view showing how to adjust the position of the apparatus for elongating optical fiber base material of the present invention.

The following describes the present invention in more detail using FIGS. 1-3.

Figures 1A, 1B:
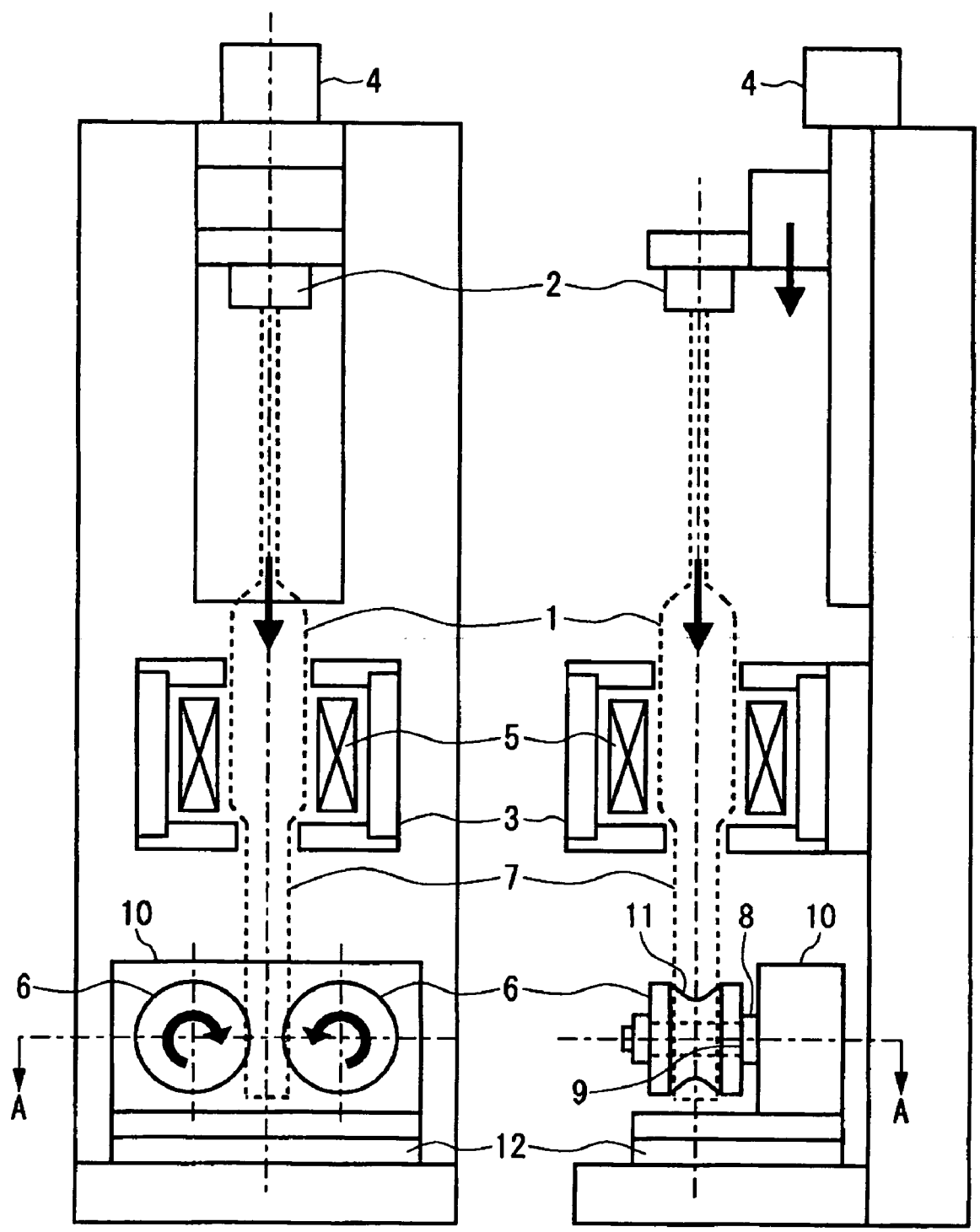
FIG. 1A is an elevation view.
FIG. 1B is a side view.

The air-through vertical apparatus for elongating optical fiber base material shown in FIGS. 1 and 2 was used to elongate the base material ingot. FIG. 1A is an elevation view and FIG. 1B is a side view. The base material ingot 1 drawn in broken line is grasped by a mounting part 2, hung in an electric furnace 3, fed by a feeder 4 at a certain speed into the electric furnace 3, and heated by a heater 5 to be softened. The softened base material ingot 1 is nipped the lower end thereof by a pair of metal pinch rollers 6 and 6 set at the lower part of the electric furnace, and drawn faster than feeding the base material ingot 1, which shrinks the base material ingot in diameter into the base material rod 7.

The pinch rollers 6 are jointed with an untapered shaft 8 having a reference edge face, pressed and fixed against the reference edge face 9 of the untapered shaft 8, rotated and driven by a drive unit via the untapered shaft 8. Referring to FIG. 2A, the pair of the pinch rollers 6 and 6 respectively has a concave roller groove 11 and 11 on the facing surfaces of the pair of the pinch rollers 6 and 6 so that the base material rod 7 is grasped stably and firmly. The grooves are such as roller grooves having a larger curvature radius than the outer diameter of the base material rod, or V-shaped roller grooves 11a (FIG. 2B) having the cross section consisting of straight lines. The base material rod 7 is grasped in the center of the facing roller grooves 11 with desired position accuracy, and drawn.

The surfaces of the roller grooves 11 are covered with heat-resistant fabric winded and fixed by mechanical means such as screws or bands around the surfaces of the rollers so that the base material rod 7 and the pinch rollers 6 don't contact directly with each other, resulting in no damage on the surface of the base material rod 7. See FIGS. 2A and 2B. The heat-resistant fabric is thin enough not to reduce the profile accuracy of the roller grooves. The drive unit 10 is set on such as a positioning table having two axial directions X and Y. The groove center of the facing roller grooves 11 and 11 of the pair of pinch rollers 6 and 6 is fitted in the central axis of the base material ingot passing through the middle of the heater 5 by a positioning table 12.

FIGS. 2A and 2B are enlarged schematic sectional view of the pinch roller cut along the line A-A shown in FIG. 1.

In the figure, the pinch roller 6 has a roller groove 11 having a larger curvature radius than the diameter of the base material rod on the surface, and winded heat-resistant fabric 13 around the surface, which is fixed with band 14. The pinch roller 6 is pressed and fixed against the reference edge face 9 of the untapered shaft 8 with bolts 15. This can make the pinch roller 6 positioned with an accuracy required for elongating the base material rod 7 without curvature. In addition to the effect of the roller groove 11, therefore, the pinch rollers 6 can hold the base material rod in the position in which the base material rod can be elongated without being curved. The untapered shaft 8 is coupled with an output shaft of a servomotor, not shown, so that the driving torque required for elongating the base material rod can be transferred to the pinch rollers 6.

FIG. 3 is a schematic view showing an example of positioning method using the apparatus elongating optical fiber base material of the present invention.

The mounting part 2 for the base material ingot is set with position adjustability in two perpendicular axial directions in a level plane. The position of the mounting part 2 is adjusted so that the vertical line 17 hanging from the mounting part 2 and having a plum bob at the end of the line runs parallel to the traveling direction of the base material ingot and passes right through the center of a small aperture formed on the center of a jig 18 indicating the center of the heater 5.

How to position the pinch rollers 6 is described below. The jig 16 is set on the pair of the pinch rollers 6 and 6 to indicate the center position of the roller grooves, and the cylindrical part of the jig 16 is grasped stably by the facing roller grooves of the both pinch rollers 6 and 6 so that the center position of the roller grooves or the groove center can be obtained. Using the positioning table 12, the pinch rollers 6 are adjusted the positions thereof in two perpendicular axial directions so that the end of the plum bob hung on the vertical line 17 fits in the center position of the jig 16. In another way, a shorter rod having almost the same diameter of the desired base material rod is prepared, and held by the pair of pinch rollers 6 and 6 so that the end of the plum bob hung on the vertical line 17 fits in the center point of the shorter rod.

The base material ingot attached to the mounting part 2 is fed into the furnace parallel to the axis running through the middle of the heater 5 and the groove center of the facing roller grooves on the pair of the pinch rollers 6 and 6. The heated and softened part of the base material rod isn't affected by the bending moment so that the base material rod prevent from being curved. The above described method using the jigs and the vertical line isn't only the way of fitting the groove center of the roller grooves on the pair of pinch rollers 6 and 6. For example, the method using a laser beam instead of the vertical line and a light receiving sensor instead of the jig 16 may be employed.

The above description explaining the present invention with the embodiments does not limit the technical scope of the invention to the above description of the embodiments. It is apparent for those in the art that various modifications or improvements can be made to the embodiments described above. It is also apparent from what we claim that other embodiments with such modifications or improvements are included in the technical scope of the present invention.

INDUSTRIAL APPLICABILITY

According to the method of elongating optical fiber base material of the present invention, the curvature correction process using a glass lathe isn't needed, and the cost of manufacturing base material rod can be reduced. Furthermore, the productivity in the process of elongating the base material rod can be improved, and the power consumption can be reduced.

The invention claimed is:

1. A method of elongating optical fiber base material comprising:
    heating and softening a base material ingot in a heating means;
    drawing said ingot with a pair of pinch rollers; and
    elongating the ingot to make base material rod including a smaller diameter than said ingot,
    wherein a roller groove of said pinch rollers includes one of a curvature radius which is greater than the outer diameter of said base material rod and a V-shaped roller groove with a cross section including straight lines formed on each surface of said pinch rollers comprised of metal,
    wherein the facing roller grooves respectively formed on the surfaces of a pair of said pinch rollers nip and draw said base material rod, and
    wherein a position of the pinch rollers and a position of a mounting part of the base material ingot are adjusted, respectively in two perpendicular axial directions in a plane perpendicular to a central axis of the heating means such that the straight lines, connecting the central axis of the heating means with a groove center of the roller grooves respectively formed on each surface of the pair of pinch rollers, are parallel to a traveling direction of the base material ingot fed into the heating means.

2. The method of elongating optical fiber base material according to claim 1, wherein a shorter rod including substantially the same outer diameter as the desired base material rod is nipped and held by a pair of pinch rollers, and
    wherein a positioning adjustment apparatus supporting said pinch rollers adjusts the position of the apparatus using one of a vertical line of laser beam and a plumb bob, which is parallel to the traveling direction of the base material ingot, runs through the middle of the heating means and the center point of the shorter rod, to determine the positions of said pinch rollers.

3. The method of elongating optical fiber base material according to claim 1, wherein a jig comprising, an upper board and a cylindrical part is mounted on a pair of pinch rollers, and
    a positioning adjustment apparatus supporting said pinch rollers adjusts a position of the apparatus using a vertical line of laser beam or a plumb bob, which is parallel to the traveling direction of the base material ingot, runs through the middle of the heating means and the center point of the shorter rod, to determine the positions of said pinch rollers.

4. The method of claim 1, wherein a surface of said pinch rollers include concave grooves for stably nipping the base material rod mounted on a position adjustment table via a mechanical reference level included in an untapered shaft, and woven fabric comprising of a heat-resistant material is wound and fixed around the surface of the pinch rollers.

5. The method of claim 1, wherein the pinch rollers adjust position such that a straight line connecting a central axis of the heating means with the groove center of the roller grooves respectively formed on the surfaces of the pair of pinch rollers is parallel to the traveling direction of the base material ingot.

6. The method of claim 1, wherein the roller groove of said pinch rollers includes both the curvature radius which is larger than the outer diameter of said base material rod, and a V-shaped roller groove with a cross section including straight lines is formed on each surface of said pinch rollers comprised of metal, and wherein the facing roller grooves respectively formed on the surfaces of a pair of said pinch rollers nip and draw said base material rod.

7. An apparatus for elongating optical fiber base material, comprising:

a heating means which heats and softens a base material ingot;

a pair of pinch rollers which draws, and elongates the base material ingot to make a base material rod including a smaller diameter than the base material ingot, said pair of pinch rollers comprised of metal, and respectively include either one of a roller groove including a curvature radius greater than the outer diameter of said base material rod and a V-shaped roller groove comprising a cross section including straight lines on the surfaces of said pinch rollers, wherein a position of the pinch rollers and a position of a mounting part of the base material ingot are adjusted, respectively in two perpendicular axial directions in a plane perpendicular to a central axis of the heating means, such that the straight lines, connecting the central axis of the heating means with a groove center of the roller grooves respectively formed on each surface of the pair of pinch rollers, are parallel to a traveling direction of the base material ingot fed into the heating means.

8. The apparatus for elongating optical fiber base material according to claim 7, wherein the surfaces of said pinch rollers are winded and fixed woven fabric comprising of heat-resistant material to prevent said pinch rollers from directly contacting to base material rod comprising of metal.

9. The apparatus of claim 7, wherein a surface of said pinch rollers include concave grooves for stably nipping the base material rod mounted on a position adjustment table via a mechanical reference level included in an untapered shaft, and woven fabric comprised of a heat-resistant material is wound and fixed around the surface of the pinch rollers.

10. The apparatus of claim 7, wherein the pinch rollers adjust position such that a straight line connecting a central axis of the heating means with the groove center of the roller grooves respectively formed on the surfaces of the pair of pinch rollers is parallel to the traveling direction of the base material ingot.

11. The method of claim 7, wherein the pinch rollers are jointed with an untapered shaft including a reference edge face, pressed and fixed against the reference edge face of the untapered shaft, rotated and driven by a drive unit via the untapered shaft, the pair of the pinch rollers respectively including a concave roller groove on the facing surfaces of the pair of the pinch rollers.

12. The apparatus of claim 7, wherein the surfaces of the roller grooves are with heat-resistant fabric wound and fixed by mechanical means around the surfaces of the rollers with no direct contact with the base material rod by the pinch rollers.

13. The apparatus of claim 7, wherein the roller groove of said pinch rollers includes the curvature radius which is larger than the outer diameter of said base material rod.

14. The apparatus of claim 7, wherein the roller groove of said pinch rollers includes the V-shaped roller groove with a cross section including straight lines formed on each surface of said pinch rollers comprised of metal, and wherein the facing roller grooves respectively formed on the surfaces of a pair of said pinch rollers nip and draw said base material rod.

15. The method of elongating optical fiber base material according to claim 2 wherein a jig comprising an upper board and a cylindrical part is mounted on a pair of pinch rollers, and a positioning adjustment apparatus supporting said pinch rollers adjusts a position of the apparatus using one of a vertical line of a laser beam and a plumb bob, which is parallel to the traveling distance of the base material ingot, runs through the middle of the heating means and the center point of the shorter rod, to determine the positions of the pinch rollers.

* * * * *